United States Patent
Fischer et al.

[11] Patent Number: 6,121,349
[45] Date of Patent: Sep. 19, 2000

[54] AQUEOUS POLYVINYL ACETAL DISPERSIONS

[75] Inventors: Hannes Fischer, Taunusstein; Matthias Mag, Oberursel, both of Germany

[73] Assignee: Clariant GmbH, Frankfurt, Germany

[21] Appl. No.: 08/936,396

[22] Filed: Sep. 25, 1997

[30] Foreign Application Priority Data

Oct. 2, 1996 [DE] Germany .............. 196 40 731

[51] Int. Cl.$^7$ .............. C08K 3/20; C08L 63/00
[52] U.S. Cl. .............. 523/412; 523/409; 525/61; 525/330.3
[58] Field of Search .................. 525/61, 330.3; 523/409, 412

[56] References Cited

U.S. PATENT DOCUMENTS

| | | |
|---|---|---|
| 2,532,223 | 11/1950 | Bromley, Jr. . |
| 2,611,755 | 9/1952 | Bromley, Jr. . |
| 4,426,492 | 1/1984 | Steckler . |
| 4,523,983 | 6/1985 | Lin . |
| 5,559,175 | 9/1996 | Kroggel et al. .......... 524/297 |

FOREIGN PATENT DOCUMENTS

| | | |
|---|---|---|
| 0 519 591 A1 | 12/1992 | European Pat. Off. . |
| 0 594 026 A2 | 4/1994 | European Pat. Off. . |
| 0 654 464 A1 | 5/1995 | European Pat. Off. . |
| 1569536 | 11/1962 | Germany . |
| 2752054A1 | 11/1977 | Germany . |
| 2817231B2 | 4/1978 | Germany . |
| 58-191 701 | 11/1983 | Japan . |
| 3174-455 | 12/1989 | Japan . |
| 3-124 734 | 5/1991 | Japan . |
| 5-295 016 | 10/1993 | Japan . |
| 7-126 567 | 5/1995 | Japan . |
| 475 862 | 3/1971 | U.S.S.R. . |
| 984895 | 3/1965 | United Kingdom . |

*Primary Examiner*—Robert Dawson
*Assistant Examiner*—D. Aylward
*Attorney, Agent, or Firm*—Scott E. Hanf

[57] ABSTRACT

Aqueous dispersions of carboxyl-containing polyvinyl acetals which contain no emulsifiers, no readily volatile organic solvents and no nonvolatile plasticizers, preparable by a) reacting hydroxyl-containing polyvinyl acetals with polycarboxylic anhydrides in the melt or in high-boiling solvents, b) neutralizing at least some of the carboxylic acid groups present in the resulting modified polyvinyl acetals, and c) dispersing the resulting salt of the modified polyvinyl acetals in water, are suitable as coating compositions for paper and textiles and as binders for paints and varnishes.

3 Claims, No Drawings

AQUEOUS POLYVINYL ACETAL DISPERSIONS

The invention relates to the preparation of dispersions of polyvinyl acetals in water and to their use as coating compositions.

Polyvinyl butyral is ideally suited as a coating material for paper and textiles and as a binder for varnishes and paints. For these applications the polymer is usually dissolved in organic liquids, for example alcohols and aromatic hydrocarbons. Since there has long been a requirement to provide coating systems which contain no organic solvents, there has been no lack of attempts to prepare aqueous solutions or dispersions of polyvinyl acetals.

Although water-soluble polymers containing acetal groups are described in JP-A 05-295 016 and JP-A 07-126 567, these products are polyvinyl alcohols with a low degree of acetalization. They should therefore be regarded not as polyvinyl acetals but as modified polyvinyl alcohols.

For dispersing polyvinyl acetals in water, essentially two procedures have been described to date. In the first case, the reaction of a polyvinyl alcohol with an aldehyde, preferably butyraldehyde, and the dispersing operation take place in one step (DE-A 27 52 054, DE-B 28 17 231). According to the second method, polyvinyl acetals are mixed with water under shearing conditions at ambient or at elevated temperature and are thereby converted to a dispersion (GB-A 984 895, U.S. Pat. No. 2 532 223, U.S. Pat. No. 2 611 755). In both processes the addition of emulsifiers is required in order to produce stable dispersions. From DE-B 28 17 231 it can be inferred that emulsifiers impair the water resistance of the coatings produced from the dispersions.

Polyvinyl acetals which are to be dispersed in water under shearing conditions usually have plasticizers added to them, for example, ricinoleates or phthalates, so that a smoothly flowing film is formed in the course of drying. The plasticizers remain in the coatings and cause a reduction in film hardness.

On the other hand, it is known from DE-A 15 69 536 that unplasticized polyvinyl butyral dispersions form chalklike coatings with poor leveling properties. It has also been proposed to facilitate the dispersing of polyvinyl acetals in water by adding low molecular mass alcohols, express reference being made to the fact that this method is only effective in the case of polyvinyl acetals which contain at least 6 carbon atoms in the aldehyde component.

It is also known to render polyvinyl acetals dispersible in water by chemical modifications to the polyvinyl alcohol on which they are based. A description is given of copolymers which comprise carboxyl groups, for example in the form of methacrylic, itaconic or maleic acid units (JP-A 58 191 701, JP-A 03-124 734), or sulfonate groups (EP-A 0 654 464, EP-A 0 594 026). These copolymers are in general more difficult to prepare than customary commercial polyvinyl acetals.

The object of the present invention was the preparation of stable aqueous dispersions of polyvinyl butyrals which, without the addition of emulsifiers and nonvolatile plasticizers, give rise to coatings having good leveling and good water resistance.

This object is achieved by reacting polyvinyl acetals, in the melt or in solution, with polycarboxylic anhydrides in such a way that some of the carboxyl groups are not reacted, then neutralizing the resulting polymeric polycarboxylic acid with bases and, finally, bringing the polymeric salt formed into aqueous dispersion by incorporation of water with stirring.

The invention provides aqueous dispersions of carboxyl-containing polyvinyl acetals which contain no emulsifiers, no readily volatile organic solvents and no nonvolatile plasticizers, preparable by a) reacting hydroxyl-containing polyvinyl acetals with polycarboxylic anhydrides in the melt or in high-boiling solvents, b) neutralizing at least some of the carboxylic acid groups present in the resulting modified polyvinyl acetals, and c) dispersing the resulting salt of the modified polyvinyl acetals in water.

In a specific embodiment of the invention, some of the carboxyl groups of the polycarboxylic anhydride-modified polyvinyl acetals are reacted with compounds which contain epoxide groups.

The polyvinyl acetals used to prepare the novel dispersions preferably have molar weights (Mw, calculated from GPC measurements of the polyvinyl alcohol precursors) of from 20,000 to 110,000 g/mol, in particular from 30,000 to 60,000 g/mol.

The polyvinyl acetals employed contain preferably from 10 to 40% by weight, in particular from 12 to 30% by weight and, with particular preference, from 15 to 25% by weight of unreacted polyvinyl alcohol units and up to 10% by weight, preferably from 0.5 to 5% by weight, of polyvinyl acetate units.

The polyvinyl acetals employed in accordance with the invention are, in particular, polyvinyl butyrals. It is a particular advantage of the invention that these polyvinyl acetals are products which are normally available commercially. In principle, however, it is also possible to employ polyvinyl acetals which have been prepared from copolymers of vinyl acetate.

Suitable polycarboxylic anhydrides are preferably those containing in total not more than four acyl groups. They can be aliphatic, aromatic or heterocyclic compounds, for example succinic, phthalic or pyromellitic anhydride. Particularly preferred polycarboxylic anhydrides are maleic and trimellitic anhydride. For each mol of polycarboxylic anhydride it is preferable to form only one ester linkage to the polyvinyl alcohol residues of the polyvinyl acetal. The molar ratio of hydroxyl groups in the polyvinyl acetal employed to anhydride groups of the polycarboxylic anhydride employed is preferably between 1:0.008 and 1:0.3, in particular between 1:0.01 and 1:0.15 and, with particular advantage, between 1:0.013 and 1:0.13.

Suitable high-boiling solvents for the reaction between polyvinyl acetal and polycarboxylic anhydride are those which contain no functional groups which react with the anhydride, and which, furthermore, are miscible at least in part with water under the conditions in which the dispersion is prepared, and which evaporate during the drying of coatings which are prepared from the novel dispersions. Appropriate examples are dimethylformamide, glycol ethers, and esters of glycol ethers. The solvents are preferably employed in amounts of up to 100 g, in particular up to 90 g and, with particular advantage, from 10 to 75 g per 100 g of polyvinyl acetal.

Compounds containing epoxide groups which according to one particular embodiment of the invention are subjected to an addition reaction with some of the unreacted acid groups of the poLymeric polycarboxylic acid are, for example, monofunctional glycidyl esters or glycidyl ethers. Glycidyl esters of aliphatic monocarboxylic acids are preferred. Particular preference is given to glycidyl esters of relatively long-chain, a-branched monocarboxylic acids. Examples of such compounds are glycidyl esters of isodecancic acids which are marketed under the designation ®Cardura E 10.

To neutralize the free carboxyl groups it is possible to employ all monofunctional organic or inorganic bases. Amines and ammonia are particularly suitable, preferably hydroxyalkylamines which may be unsubstituted or substituted by alkyl or aryl.

The present invention also provides a process for preparing aqueous dispersions of polyvinyl acetals which contain no emulsifiers, no readily volatile organic solvents and no nonvolatile plasticizers, by a) reacting hydroxyl-containinq polyvinyl acetals with polycarboxylic anhydrides in the melt or in high-boiling solvents, b) neutralizing at least some of the carboxylic acid groups present in the resulting modified polyvinyl acetals and c) dispersing the resulting salt of the modified polyvinyl acetals in water.

In a particularly advantageous embodiment of the invention the carboxyl-containing polyvinyl acetal formed in step a), or its reaction product with compounds containing epoxide groups, is diluted, before, during or after the neutralization step b), with a low-boiling, water-soluble auxiliary solvent which is different from the solvent in which the reaction of polyvinyl acetal and acid anhydride may have been carried out. Examples of suitable low-boiling solvents are acetone, methanol and isopropanol, preferably ethanol. The solvent is distilled off following the preparation of the aqueous dispersion.

The reaction between polyvinyl acetal and carboxylic anhydride is preferably carried out under conditions under which essentially only anhydride rings, and not free carboxyl groups, react with the hydroxyl groups in the polymer. It is advantageous to mix the polyvinyl acetal in the amount stated above with a high-boiling solvent, preferably with esters of glycol ethers, in particular with diethylene glycol dialkyl ethers or dipropylene glycol dialkyl esters and, with particular preference, with the dimethyl esters thereof, in order to reduce the viscosity of the reaction material.

The addition reaction of the polycarboxylic anhydride with the polyvinyl acetal takes place preferably at temperatures from D to 155° C., in particular from 50 to 150° C. and, with particular preference, from 120 to 145° C. In the particularly preferred temperature range the reaction proceeds almost quantitatively in less than two hours. The term quantitatively should be understood as meaning that only one of the carboxyl functions of the anhydride groups is attached to the polymer, and that the acid number of the end product corresponds to the calculated value at the end of the reaction period. If the reaction is carried out at lower temperatures, for example between 50 and 100° C., the reaction time is extended so that the reaction can proceed quantitatively.

The optional addition reaction of compounds containing epoxide groups with some of the carboxyl groups of the polyvinyl acetals modified in step a) with polycarboxylic anhydrides takes place before the neutralization step b), preferably at temperatures from 100 to 155° C., in particular from 110 to 150° C. and, with particular preference, from 120 to 145° C. The temperature is preferably maintained until the epoxide groups in the reaction mixture have almost all been consumed. The reaction time under the stated reaction conditions is in general between 60 and 120 minutes, the reaction taking longer the lower the temperature.

The neutralization of the modified polyvinyl acetal that contains acid groups is preferably carried out, in accordance with the invention, by stirring the stoichiometrically calculated amount of base into the polymer melt or polymer solution at from 60 to 120° C., in particular at from 70 to 100° C. The neutralization temperature is chosen such that the reaction mass can be stirred readily. A particularly favorable procedure is one in which the base is either dissolved in a low-boiling water-miscible auxiliary solvent, for example an alcohol or ketone, or is added together with such an auxiliary solvent to the polymer melt or polymer solution, since by this means the homogeneous distribution of the base and the subsequent addition and distribution of the water are facilitated. The amount of novel organic auxiliary solvent used is between 20 and 65% by weight, preferably between 25 and 60% by weight, based on the polyvinyl acetal employed.

The dispersing c) of the salt of the modified polyvinyl acetals takes place, according to the novel process, by incorporating water with stirring, preferably at temperatures from 50 to 100° C., in particular from 55 to 95° C. and, with particular preference, from 60 to 91° C. The addition of the water at temperatures over 100° C., for example up to 130° C., preferably up to 120° C., under pressure in order to prevent evaporation of the water and of the solvents, is likewise possible. The amount of water to be added should preferably be from 300 to 600 ml, in particular from 330 to 550 ml, per 100 g of polyvinyl butyral. The speed of stirring in the course of the dispersing of the neutralized polymer in water should be from 75 to 300, preferably from 100 to 250, rpm. Stirrer speeds higher than those stated are not necessary to prepare the dispersions.

Finally, the auxiliary solvent added if desired in the course of neutralization is completely distilled off under reduced pressure, for example at from 50 to 300 mbar, preferably from 50 to 150 mbar. It is likewise possible to distil off some of the added water under the stated conditions, in order to increase the solids content of the dispersions.

The novel aqueous dispersions preferably have solids contents of from 18 to 40% by weight, in particular from 20 to 35% by weight, and with particular preference, from 23 to 30% by weight. They are of low viscosity, finely disperse, and do not form deposits.

The dispersed polymer particles have diameters of preferably <200 nm, in particular <160 nm and, with particular preference, from 30 to 120 nm (weight average, measured by photon correlation spectroscopy).

The novel dispersions are free from low-boiling organic solvents but may include up to 10% by weight, preferably <8% by weight and, in particular, <6% by weight of the high-boiling solvents.

Coatings spread from these dispersions dry to form smooth, solid coatings having very good water resistance and hardness.

The invention also provides for the use of the aqueous dispersions of polyvinyl acetals as coating compositions for paper and textiles and as binders for varnishes and paints.

The examples which follow describe the preparation of the novel dispersions and their properties. The parts and percentages in the examples are by weight unless noted otherwise.

EXAMPLE 1

150 g of a polyvinyl butyral having a mean molar weight (Mw) of 54,500 and a residual polyvinyl alcohol content of 19.5% were mixed with 64.5 g of diethylene glycol dimethyl ether and the mixture was reacted with 8.1 g of trimellitic anhydride at 125 to 134° C. for 2 hours. After cooling to 95° C., a mixture of 45 ml of 25% strength aqueous ammonia solution and 65 ml of ethanol was added. Subsequently, 505 ml of water were added with intense stirring, during which the temperature fell to 60° C. The ethanol was removed completely from the resulting dispersion by distillation at 50° C. and 100 mbar.

The end product was a dispersion having the following properties:

| | |
|---|---|
| Solids content: | 28% |
| pH: | 6.6 |
| Viscosity (acc. to Brookfield): | 70 mPa · s |
| Particle size (weight average): | 146 nm |

The dispersion dfid not form a deposit after storage for a number of months. Thin layers of the dispersion produced completely transparent, solid and flexible films.

EXAMPLE 2

75 g of a polyvinyl butyral having a mean molar weight (Mw) of 54,500 and a residual polyvinyl alcohol content of 19.5% were mixed with 53 g of diethylene glycol dimethyl ether with heating at 125° C. and the mixture was reacted with 4.5 g of trimellitic anhydride at 130 to 135° C. for two hours. After cooling to 100° C., 3 g of dimethylaminoethanol was added. Finally, 185 ml of water were incorporated into the neutralized polymeric carboxylic acid with stirring at 90° C.

The dispersion had the following properties:

| | |
|---|---|
| Solids content: | 25.5% |
| pH: | 7.2 |
| Viscosity (acc. to Brookfield): | 130 mPa · s |
| Particle size (weight average): | 165 nm |

EXAMPLE 3

75 g of a polyvinyl butyral having a mean molar weight (Mw) of 54,500 and a residual polyvinyl alcohol content of 19.5% were mixed with 53 g of diethylene glycol dimethyl ether with heating at 125° C. and the mixture was reacted with 2.25 g of trimellitic anhydride at 130 to 135 ° C. for two hours. After cooling to 100° C., 1.5 g of dimethylaminoethanol was added. Finally, 180 ml of water were incorporated into the neutralized polymeric carboxylic acid with stirring at 90° C.

The dispersion had the following properties:

| | |
|---|---|
| Solids content: | 25.4% |
| pH: | 7.0 |
| Viscosity (acc. to Brookfield): | 100 mPa · s |
| Particle size (weight average): | 180 nm |

EXAMPLE 4

75 g of a polyvinyl butyral having a mean molar weight (Mw) of 54,500 and a residual polyvinyl alcohol content of 19.5% were mixed with 41 g of diethylene glycol dimethyl ether with heating at 125° C. and the mixture was reacted with 4.5 g of trimellitic anhydride at 125 to 134° C. for 4 hours. Then 12.5 g of the glycidyl ester of an α-branched monocarboxylic acid (Cardura E 10) were added and the mixture was held at a temperature of 129 to 134° C. for 1.5 hours. After this time, epoxide groups could not longer be detected by analysis in the reaction mixture. After cooling to 100° C., 3.3 g of dimethylethanolamine were added.

Subsequently, 250 ml of water were incorporated with stirring into the neutralized polymeric carboxylic acid, during which the temperature was lowered continuously to 85° C.

| | |
|---|---|
| Solids content: | 24.7% |
| pH: | 7.5 |
| Viscosity (acc. to Brookfield): | 350 mPa · s |
| Particle size (weight average): | 159 nm |

The dispersion did not form a deposit even after storage for a number of months. Thin layers of this dispersion gave completely transparent, solid and flexible films.

EXAMPLE 5

150 g of a polyvinyl butyral having a mean molar weight (Mw) of 54,500 and a residual polyvinyl alcohol content of 19.5% were mixed with 89 g of diethylene glycol dimethyl ether with heating at 125° C. and the mixture was reacted with 8.1 g of trimellitic anhydride at 125 to 135° C. for 2 hours. Then 24.6 g of the glycidyl ester of an α-branched monocarboxylic acid (Cardura E 10) were added and the mixture was held at a temperature of 131 to 135° C. for 1.5 hours. After this time, epoxide groups could not longer be detected by analysis in the reaction mixture. After cooling to 100° C., a solution of 7.25 g of dimethylaminoethanol in 92 ml of ethanol was added. Subsequently, 770 ml of water were incorporated with stirring into the neutralized polymeric carboxylic acid, during which the temperature was lowered continuously to 70° C. By distillation under the conditions indicated in Example 1, ethanol and minor amounts of water were distilled off.

The dispersion formed had the following properties:

| | |
|---|---|
| Solids content: | 24.7% |
| pH: | 9.15 |
| Viscosity (acc. to Brookfield): | 16 mPa · s |

The dispersion did not form a deposit even after storage for a number of months. Thin layers of this dispersion gave completely transparent, solid and flexible films.

EXAMPLE 6

100 g of a polyvinyl butyral having a mean molar weight (Mw) of 42,500 and a residual polyvinyl alcohol content of 19.5% were mixed with 43 g of diethylene glycol dimethyl ether with heating at 125° C. and the mixture was reacted with 5.53 g of trimellitic anhydride at 132 to 135° C. for 2 hours. Then 16.1 g of the glycidyl ester of an α-branched monocarboxylic acid (Cardura E 10) were added and the mixture was held at a temperature of 129 to 135° C. for 1.5 hours. After this time, epoxide groups could not longer be detected by analysis in the reaction mixture. After cooling to 99° C., a mixture of 55 ml of ethanol and 36.5 g of ammonia (25% strength in water) was added with stirring to the reaction mixture. Subsequently, 500 ml of water were incorporated with stirring into the neutralized polymeric carboxylic acid, during which the temperature was lowered continuously to 63° C. By distillation under the conditions indicated in Example 1, ethanol and some of the water were distilled off from the resulting dispersion.

The dispersion thus prepared had the following properties:

| | |
|---|---|
| Solids content: | 27.4% |
| pH: | 7.1 |
| Viscosity (acc. to Brookfield): | 26 mPa · s |
| Particle size (weight average): | 112 nm |

The dispersion did not form a deposit even after storage for a number of months.

EXAMPLE 7

100 g of a polyvinyl butyral having a mean molar weight (Mw) of 42,500 and a residual polyvinyl alcohol content of 19.5% were mixed with 36 g of dipropylene glycol dimethyl ether with heating at 125° C. and the mixture was reacted with 4.65 g of trimellitic anhydride at 137 to 145° C. for 2 hours. Then 7.02 g of the glycidyl ester of an α-branched monocarboxylic acid (Cardura E 10) were added and the mixture was held at a temperature of 137 to 145° C. for 1.5 hours. After this time, epoxide groups could not longer be detected by analysis in the reaction mixture. After cooling to 58° C., a mixture of 31 ml of ethanol and 3.8 g of dimethylaminoethanol was added with stirring to the reaction mixture. Subsequently, 246 ml of water were incorporated with stirring into the neutralized polymeric carboxylic acid at from 81 to 78° C. By distillation under the conditions indicated in Example 1, ethanol and some of the water were distilled off from the resulting dispersion.

The dispersion thus prepared had the following properties:

| | |
|---|---|
| Solids content: | 24.8% |
| pH: | 7.82 |
| Viscosity (acc. to Brookfield): | 86 mPa · s |
| Particle size (weight average): | 86 nm |

The dispersion did not form a deposit.

EXAMPLE 8

100 g of a polyvinyl butyral having a mean molar weight (Mw) of 42,500 and a residual polyvinyl alcohol content of 19.5% were mixed with 36 g of dipropylene glycol dimethyl ether with heating at 125° C. and the mixture was reacted with 4.65 g of trimellitic anhydride at 137 to 145° C. for 2 hours. Then 7.02 g of the glycidyl ester of an α-branched monocarboxylic acid (Cardura E 10) were added and the mixture was held at a temperature of 137 to 1450C for 1.5 hours. After this time, epoxide groups could not longer be detected by analysis in the reaction mixture. After cooling to 84° C., a mixture of 38 ml of ethanol and 4 g of dimethylaminoethanol was added with stirring to the reaction mixture. Subsequently, 246 ml of water were incorporated with stirring into the neutralized polymeric carboxylic acid, during which the temperature was lowered continuously to 74° C. By distillation under the conditions indicated in Example 1, ethanol and some of the water were distilled off from the resulting dispersion.

The dispersion thus prepared had the following properties:

| | |
|---|---|
| Solids content: | 30.0% |
| pH: | 7.55 |
| Viscosity (acc. to Brookfield): | 91 mPa · s |
| Particle size (weight average): | 112 nm |

The dispersion did not form a deposit after storage.

We claim:

1. A stable aqueous dispersion of carboxyl-containing polyvinyl acetals which contains no emulsifiers, no readily volatile organic solvents and no nonvolatile plasticizers, preparable by a) reacting hydroxyl-containiny polyvinyl acetals with polycarboxylic anhydrides in the melt or in high-boiling solvents, b) neutralizing at least some of the carboxylic acid groups present in the resulting modified polyvinyl acetals, c) reacting wherein some of the carboxylic groups of the polycarboxylic anhydride-modified polyvinyl acetals with compounds containing one or more epoxide groups; and d) dispersing the resulting salt of the modified polyvinyl acetals in water.

2. The aqueous dispersion as claimed in claim 1, wherein the epoxide-containing compounds are monofunctional glycidyl esters of aliphatic carboxylic acids.

3. The process as claimed in claim 1, wherein some of the carboxylic acid groups of the polyvinyl acetals modified in step a) with polycarboxylic anhydrides are reacted prior to the neutralization b) with compounds containing epoxide groups at a temperature from 100 to 155° C.

* * * * *